May 24, 1966  R. J. ALLEN ETAL  3,253,273

DATA READER SYSTEM

Filed April 19, 1963  2 Sheets-Sheet 1

INVENTORS
ROBERT J. ALLEN
DONALD D. VAWTER
ROBERT E. WIMMER
JOHN W. FLORA

BY Donald J. Ellingsberg

AGENT

INVENTORS
ROBERT J. ALLEN
DONALD D. VAWTER
ROBERT E. WIMMER
JOHN W. FLORA

United States Patent Office 3,253,273
Patented May 24, 1966

3,253,273
DATA READER SYSTEM
Robert J. Allen, Granada Hills, and Donald D. Vawter and Robert E. Wimmer, Canoga Park, Calif., and John W. Flora, Denver, Colo., assignors to North American Aviation, Inc.
Filed Apr. 19, 1963, Ser. No. 274,113
4 Claims. (Cl. 340—347)

The present invention relates to a data reader system and more particularly to a data reduction system for converting information in the form of analog displays to visual readout form.

Continued scientific and technical progress is dependent in part upon the meaningful reduction of data. However, this data is accumulating at such a rate that data facilities are overflowing with unreduced information. A substantial amount of this recorded data is in the form of oscillographic strip charts where the amplitude of any particular curve or analog plot is directly proportional to some variable being recorded. The relationship between the amplitude of the particular curve trace transcribed on the strip chart and the variable is known by prior adjustment and calculation. For example, one inch of the chart transverse calibrations may represent 1,000° C. Reduction of this recorded data by visual observation can become time consuming, particularly since the inclusion of an adequate calibration grid on the oscillographic chart is usually inconvenient. Manual methods of data reduction require measurement with a calibrated rule and application of an appropriate scale factor to obtain reduced data in the desired units.

Data reduction instruments have been devised to assist in the visual reduction of recorded data. Since these instruments are inherently complex and expensive, various design compromises have been adopted in an attempt to obtain reliability, economy, and ease of operation. For example, setting a desired scale factor into a known data reduction instrument necessitates referral of the instrument to a recorded calibration signal. Over a prolonged period of data reduction, frequent referral of the instrument to the calibration signal is necessary to determine whether the instrument has drifted from the pre-set scale factor. This referral is time consuming, relatively difficult, and inconvenient. Alternatively, expensive techniques are required to insure stability in data reduction instruments.

Accordingly, it is an object of the invention to provide a new and improved data reduction system.

Another object of the invention is to provide a new and improved data reader system for converting analog displays to visual readout form in units directly proportional to a particular curve amplitude.

A further object of the invention is to provide a data reader system having digital readout to eliminate analog interpolation.

It is also an object to provide a data reduction system having a new and improved scale factor adjustment.

Likewise, it is also an object to provide a data reduction system which intermittently and automatically indicates any system drift from a pre-set scale factor.

An additional object of the invention is to provide a data reader system that is compact, highly accurate, reliable, and inexpensive.

Further objects, features, and the attending advantages of the invention will be apparent with regard to the following description when read in connection with the accompanying drawings in which.

Briefly, in accordance with one form of the invention, a data reader system is provided for converting analog data to visual readout form. The system further provides that the electrical signal generated by positioning a cursor linked to an adjustable potentiometer tap is intermittently substituted for a unit value electrical analog signal so that any system drift from an adjustable scale factor setting is readily apparent.

The data reader system of the present invention has electromechanical and electrical inputs which perform the operation defined by the equation $X = AS + B$; where X is the value of the function displayed on the analog plot, A is the displacement of the particular curve trace from a zero position, S is the sensitivity of the curve recording system, and B is a constant dependent upon the displacement of the trace zero position from some arbitrary position on the analog plot or information display.

Figure 1:
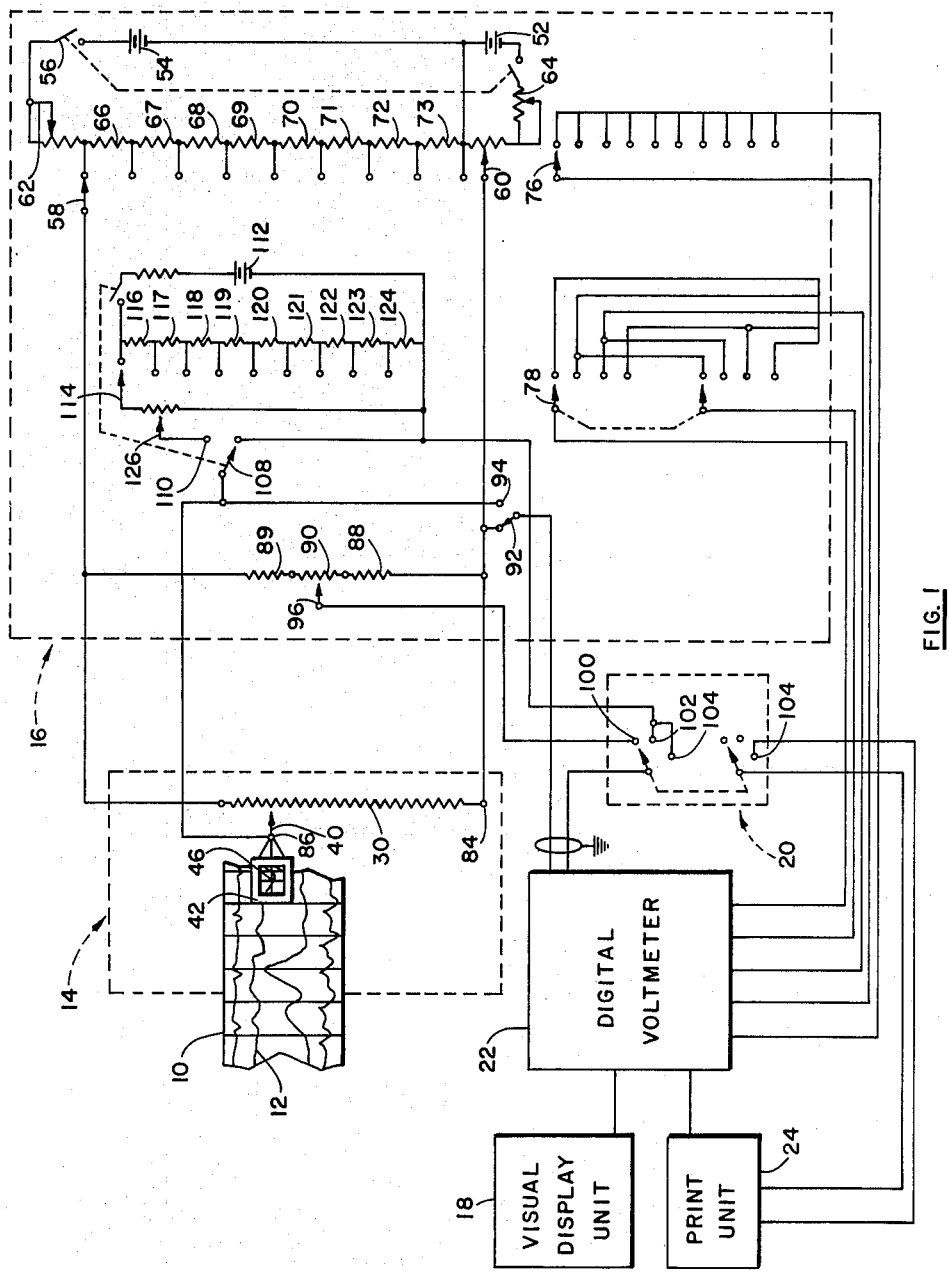
FIGURE 1 is a circuit diagram, partly schematic, of the invention.

Referring now to FIGURE 1, one form of the data reader system of the invention is shown in association with a chart 10, such as an oscillographic strip chart, which has one or more graphically recorded information traces or analog plots, such as trace 12, transcribed thereon. The data reader system has several electrically linked components. These include a reader head 14, a control unit 16, an optional visual remote display unit 18, a suitable switch 20, and a digital voltmeter 22 for converting analog signals to equivalent numerical readout form. Although not considered critical to the operation of the present invention, a well-known tape print-out or card punch unit 24, a common accessory for digital voltmeters, may be utilized to provide a permanent visual record of data reduced by the new and improved data reader system. Switch unit 20 may be electrically linked to the print-out or punch unit 24 as shown by FIGURE 1.

The control unit 16 is the primary component of the data reader system of the present invention. The control unit 16 provides direct current excitation for the reader head 14; selection of a desired scale factor setting (physical units per scalar quantity deflection); zero bias of any reference point on a curve trace; and, selection of the physical units, placement of an automatic decimal, and, when the visual display is a digital output display, a definite physical number for visual readout that does not require interpolation.

The control unit 16 further provides, in conjunction with the scale factor setting, an electrical analog of a scalar quantity, i.e. one scale unit or some multiple thereof, which is accurately pre-set and serves as a continuous check on the particular scale factor setting. This subsidiary electrical circuit permits setting of the scale factor without necessity of referring the data reader system of the invention to a recorded calibration signal. Conversely, if it is desired to calibrate the data reader system of the invention from a recorded calibration signal, the recording system sensitivity is automatically determined by the subsidiary circuit.

Figure 2:
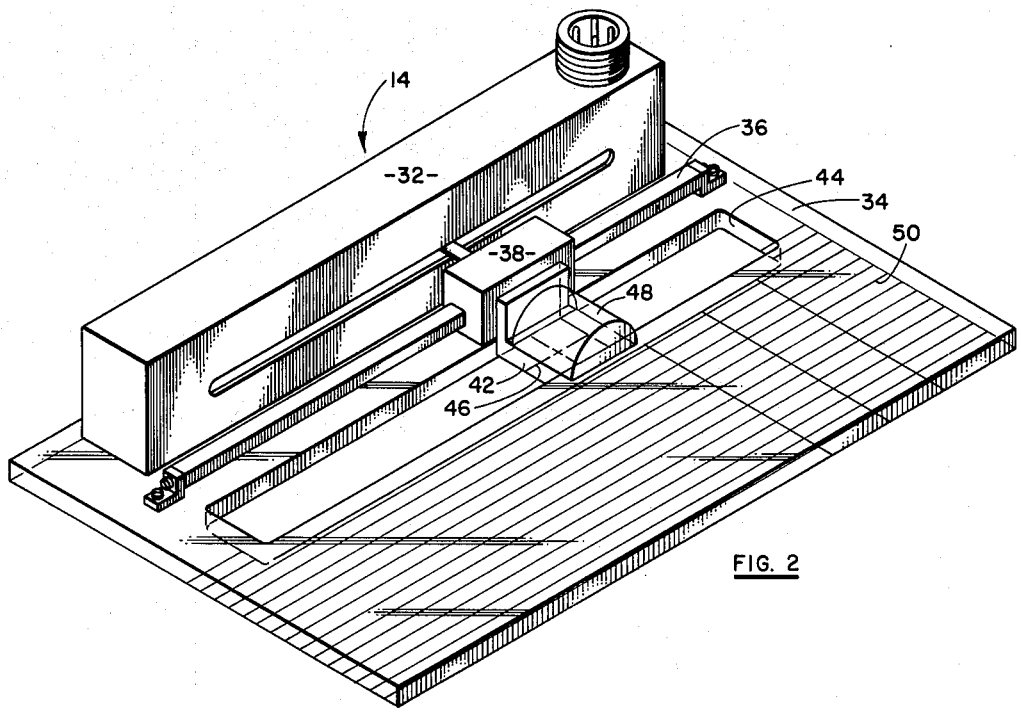
FIGURE 2 is a perspective view showing the reader head of the invention.

Referring now to FIGURES 1 and 2, reader head 14 provides an electromechanical input to the data reader system. Reader head 14 has a variable voltage divider, the linear motion potentiometer slide wire 30, positioned within a suitable housing member 32. The housing member 32 and the potentiometer 30 are secured to a suitable transparent plate 34. The plate 34 may be formed from Lucite or the like. A slider bar 36 is secured to the plate 34 in generally parallel arrangement with the potentiometer 30. Slider bar 36 receives a slider block 38 which is connected directly to an adjustable tap or wiper 40 of the linear motion protentiometer 30 to substantially eliminate backlash.

A precision machined indicator 42, secured to the slider block 38, extends into an elongated slot 44 that is formed in the plate 34. The indicator or cursor 42 has a finely inscribed hairline 46 adjacent to the surface of the strip chart 10 to substantially eliminate parallax. A half spherical lens 48, or any other suitable lens configuration, may be mounted on the movable indicator 42 to provide magnification as an aid to more rapid data reduction.

Reader head 14 is correctly positioned on the chart 10 by aligning the scribed axis lines, such as line 50, on the axes of the chart. A conventional pantograph suspension arrangement, not shown, can be utilized to more rapidly align the reader head 14 on the $x$–$y$ axes of the chart 10.

Control unit 16, as shown by FIGURE 1, provides an electrical input to the data reader system of the invention. Control unit 16 is connected in the circuit through the potentiometer slide wire 30. In operation, batteries 52 and 54 provide direct current excitation for the slide wire 30 when DPST switch 56 is closed. While batteries, such as 52 and 54, provide the constant voltage supply for the data reader system as shown by FIGURE 1, it is considered to be within the scope of the present invention to use any suitable source of direct or alternating current instead of the indicated batteries. However, digital voltmeter 22 would require suitable modification to accomplish the desired response to phase and amplitude of an alternating wave form where such is used. The digital voltmeter 22 is energized in a conventional manner as is well-known in the art.

Prior to scaling points on a particular curve trace, such as trace 12, the appropriate scale factor for the given curve is set into the data reader system of the invention. This scale factor represents the number of physical units per scalar quantity deflection. The desired scale factor is set in by adjusting rotary switch 58 to one of several possible positions. Rotary switch 58 provides a coarse scale factor setting while adjustable potentiometer 60 provides a fine scale factor adjustment. Trimmer potentiometers 62 and 64 are provided in series with the fixed resistors 66–73 that are individually connected between the respective switch positions of rotary switch 58. While rotary switch 58 is shown as having nine positions, any similar rotary switch having one or more switch positions as desired is also considered to be within the present inventive concept. Further, a single potentiometer and battery can replace scale factor switch 58 and the associated resistors and potentiometers if desired.

The scale factor set into the control unit 16 is displayed as a digital output in the standard digital voltmeter 22 or in the visual display unit 18 as shown by FIGURE 1 when the display unit is connected to the digital voltmeter. Scale factor units for the particular scale factor can also be displayed in unit 18 by adjusting rotary switch 76 to apply a voltage to the desired lamp, not shown, in the display unit. The selected lamp illuminates a desired symbol plate, i.e. KW, MW, PSI, and the like, in the display unit 18 to indicate the scale units for the particular scale factor that is set into the control unit 16 of the data reader system.

Double pole switch 78 provides a decimal shift in the visual display, to allow for an increased range of scale factor settings in the data reader system of the invention. The digital voltmeter 22 as shown by FIGURE 1 is electrically connected to switch 78 in the control unit 16, so that operation of switch 78 permits positioning of the decimal point in the visual display appropriate to the decimal magnitude of the physical units to be displayed. This function may be considered as the multiplication of the digital voltmeter calibration by some integral power of ten and does not interfere with the automatic sensitivity and decimal position shifts which may be a standard function of the digital voltmeter 22. If desired, additional decimal positions can be provided as digital output displays by suitable symbol plates, such as an "×10" plate, in the "scale units" display of unit 18 or voltmeter 22.

The scale factor setting for the data reader system of the invention represents the voltage gradient in volts per scalar quantity, for example one inch, along the potentiometer slide wire 30, as shown by FIGURE 1. A scale factor setting or range, for example, of .100 to 999. units per inch, where the lineal travel of the adjustable tap 40 is five inches, requires that the maximum voltage applied across the slide wire 30 must be the product of 5 and 999 and some power of 10, or approximately, $5000 \times 10^x$. Selecting five volts, i.e. $x = -3$, as an example, potentiometer 62 and each of the fixed resistors 66–73 provide .5 volt per switch position or step of the scale factor rotary switch 58. The scale factor potentiometer 60 provides a zero to .5 volt adjustment and controls the last two figures of the desired scale factor setting as set in the control unit 16 and displayed in the visual display, either of unit 18 or voltmeter 22.

The potentiometer slide wire 30 in the reader head unit 14 develops a voltage between terminals 84 and 86 that is proportional to the lineal deflection of the precision indicator 42 directly coupled to the adjustable tap 40 through slider block 38. In order to accurately display a scale factor set into the control unit 16, the voltage across a scalar quantity of the slide wire 30 must be provided. A subsidiary circuit is provided in the control unit 16 of the data reader system of the invention since it would be cumbersome every time the scale factor is set to refer the reader head 14 to a recorded calibration signal or to accurately set the precision indicator 42 to a scalar quantity reference on the slide wire 30. It is contemplated that the subsidiary circuit can be the electrical analog of one inch or any multiple scalar quantity thereof.

The electrical analog circuit of one scale unit or multiple thereof is composed of fixed resistors 88 and 89, and an adjustable potentiometer 90. Calibration of the subsidiary circuit requires adjusting switch 92 to the calibrate switch position 94 and accurately setting the precision indicator 42 with tap 40 to a scalar quantity deflection, such as one inch, on slide wire 30. Potentiometer 90 is then adjusted so that the voltage across resistor 88 and the adjusted portion of potentiometer 90 will equal the voltage across the scalar quantity; for example, the one inch of slide wire 30. This condition is then indicated by a zero reading in the particular visual output display. The calibrate switch 92 is then returned to the normal position as shown by FIGURE 1. In the operating mode, the resistors 88 and 89, and the potentiometer 90 see the same voltage as the slide wire 30 so that at all times the voltage terminal 96 of the potentiometer represents the scale factor, such as volts per inch displacement and the like.

The electrical analog circuit provides a continuous integrity check for the new and improved data reader system. When the switch 20, as shown by FIGURE 1, is in the rest position 100, the particular scale factor, appropriate scale units, and decimal position, as set into the control unit 16, are displayed in the particular visual display unit. The visual display not only reminds the user of the data reader system of the particular scale factor setting but also insures that any drift of the system, i.e. any drift from the pre-set scale factor value, is visually indicated. This is particularly desirable during extended periods of continuous data reduction when drift is more likely to occur.

An absolute reading for any particular point on a curve trace, such as trace 12 on chart 10, is obtained by moving the hair line 46 of the precision indicator 42 to cross the curve trace at the desired point. Since the potentiometer tap 40 is directly connected to the indicator 42, adjustment of switch 20 to the first detent position 102 displays the output voltage developed between terminals 84 and 86. This output voltage is proportional to the deflection of the indicator 42 as measured from a predetermined reference line on the chart 10. When the tape print-out or card punch unit 24 is utilized for a permanent visual record, the switch 20 is adjusted to the second detent position 104 to direct the proportional signal to the recording or print unit 24.

The data reader system of the invention also provides for the determination of differential readings. A reference shift or base line zero circuit in the control unit 16 is connected in the circuit by switching base line zero switch 108 from the "off" or normal position as shown in FIGURE 1 to the "on" position at 110. When switch 20 is in the first detent or readout position 102, the output voltage signal between termianls 84 and 86 can be reduced to zero by an opposing voltage from battery 112 in the base line zero circuit. Rotary switch 114 places a desired number of the fixed resistors 116–124 in the reference shift circuit to provide a coarse control of the opposing voltage. Potentiometer 126 provides a fine control adjustment of the opposing voltage from battery 112. Again, a single potentiometer and battery can replace switch 108 and the associated resistors and potentiometer 126 if desired. It is contemplated that suitable provisions, not shown, may also be provided for reversing the polarity of battery 112 to increase the range and flexibility of the zero adjustment.

The base line zero circuit in the control unit 16 permits the original reference line of chart 10 to be used as a reference for the reader head 14, but the circuit also yields a readout value in the particular visual display unit which indicates the amount of an excursion of the precision indicator or cursor 42 above a new reference line. This is accomplished by adjusting the indicator 42 to the new reference line; adjusting the switch 20 to the first detent position 102; and, adjusting switch 108 and potentiometer 126 of the base line zero circuit until the value appearing in the visual display is zero. When the switch 20 is returned to the rest position 100, the value of any point now brought under the indicator 42 of the reader head unit 14 will be in reference to the new reference line of the particular curve or analog plot.

The data reader system of the present invention, as shown by FIGURES 1 and 2, thus provides an electrical analog of linear displacement and converts this analog signal to digital form for visual readout. When circumstances require an analog-to-analog data reduction system, a suitable analog indicating device, such as a standard voltmeter, may be substituted for the digital voltmeter 22, shown by FIGURE 1. The analog-to-analog embodiment of the data reader system retains the features of (1) an adjustable scale factor, (2) an electrical analog of a scalar quantity, and (3) a base line zero subsidiary circuit, all of which have been previously described and shown by FIGURE 1.

As will be evidenced from the foregoing description, certain aspects of the invention are not limited to the particular details of construction illustrated. While the base line zero compensation circuit, shown by FIGURE 1, is connected in series with the lead to the first detent position 102 of switch 20, this circuit can also be placed in series with the lead from switch 20 to the digital voltmeter 22. The last mentioned circuit arrangement has the advantage of indicating drift in the zero correction voltage as well as any drift in the slide-wire voltage. The output display, when switch 20 is in the rest position 100, is still a constant, although not numerically equal to the scale factor. The scale factor may be made to appear in the output display by throwing switch 108 to the "off" position, as shown by FIGURE 1.

For increased versatility of the data reader system, a multi-element potentiometer can also be incorporated into the reader head unit thus providing a selection for log functions, powers, correction for curvilinear coordinates, and the like. It is contemplated that other modifications and applications will occur to those skilled in the art and, therefore, it is intended that the appended claims shall cover such modifications and applications that do not depart from the true spirit and scope of the invention.

Having described the invention what is claimed is:

1. A data reader system for converting analog data to digital form comprising:
   (a) variable voltage divider means generating a first electrical analog signal,
   (b) electrical analog means generating at least a second electrical analog signal,
   (c) switch control means responsive to each of said first and second analog signals to intermittently substitute said voltage divider means for said electrical analog means,
   (d) digital voltmeter means connected to said switch control means and responsive to each of said first and second analog signals to produce respective first and second electrical digital signals,
   (e) display means connected to said digital voltmeter means and responsive to each of said first and second electrical readout signals to produce an external numerical readout of each of said digital signals, and
   (f) a substantially constant input voltage connected to said variable voltage divider means and said electrical analog means.

2. A data reader system comprising:
   (a) a reader head adapted to be brought into registration with a chart having at least one curve recorded thereon,
   (b) a variable voltage divider cooperating with said reader head and having a movable wiper,
   (c) a movable cursor connected to said wiper and adapted to be brought into registration with the chart,
   (d) said voltage divider generating a first electrical signal proportional to an excursion of said cursor from a selected reference point to a desired point on the chart,
   (e) adjustable electrical analog means generating a predetermined second electrical signal that is electrically equivalent to a selected one of said first electrical signals,
   (f) adjustable voltage means connected to said voltage divider and said electrical analog means, and
   (g) switch means responsive to a selected one of said first and second electrical signals to produce a selected readout signal from the data reader system so that respective ones of said first and second signals represent electrically a voltage signal which is a function of the excursion of said cursor and a calibration factor of the system.

3. The reader system of claim 2 in which said second electrical analog signal is a multiple of said selected one of said first electrical signals.

4. The data reader system of claim 2 in which said variable voltage divider is connected to an adjustable bias voltage means generating a predetermined electrical signal combining with said first electrical signal so that the effective position of the selected reference line is electrically adjusted.

References Cited by the Examiner
UNITED STATES PATENTS

| | | | |
|---|---|---|---|
| 2,755,020 | 7/1956 | Belcher | 340—347 |
| 2,866,596 | 12/1958 | Hoefs et al. | 340—347 |
| 3,063,637 | 11/1962 | Burhans | 235—197 |
| 3,187,318 | 6/1965 | Chapman | 340—347 |

MALCOLM A. MORRISON, *Primary Examiner.*

M. A. LERNER, W. J. KOPACZ, *Assistant Examiners.*